United States Patent [19]

Meguerian et al.

[11] 4,104,360

[45] Aug. 1, 1978

[54] PROCESS FOR REDUCING OXIDES NITROGEN IN THE EXHAUST GAS FROM INTERNAL COMBUSTION ENGINES

[75] Inventors: Garbis H. Meguerian, Olympia Fields; Frederick W. Rakowsky, Naperville, both of Ill.

[73] Assignee: Standard Oil Company, Chicago, Ill.

[21] Appl. No.: 568,469

[22] Filed: Apr. 16, 1975

Related U.S. Application Data

[63] Continuation-in-part of Ser. No. 329,898, Feb. 5, 1973, abandoned, which is a continuation-in-part of Ser. No. 104,214, Jan. 6, 1971, abandoned.

[51] Int. Cl.$^2$ ............................................. B01D 53/34
[52] U.S. Cl. .............................. 423/213.2; 423/213.5; 423/239; 23/288 FC
[58] Field of Search .............. 423/213.2, 213.5, 213.7, 423/239; 23/288; 252/477; 60/301

[56] References Cited

U.S. PATENT DOCUMENTS

| | | | |
|---|---|---|---|
| 3,071,449 | 1/1963 | Shustack | 423/213.5 |
| 3,206,414 | 9/1965 | Gunther | 423/213.5 |
| 3,410,651 | 11/1968 | Brandenburg | 423/213.2 |
| 3,554,264 | 12/1970 | Hardison | 423/213.7 |
| 3,565,574 | 2/1971 | Kearby | 423/213.5 X |
| 3,576,596 | 4/1971 | Krane | 423/239 |
| 3,719,739 | 3/1973 | Thompson | 423/213.5 |
| 3,773,894 | 11/1973 | Bernstein et al. | 423/213.5 |
| 3,839,535 | 10/1974 | Ashburn | 423/213.2 |
| 3,969,480 | 7/1976 | Fedor et al. | 423/213.5 |

FOREIGN PATENT DOCUMENTS 354,692  2/1930  United Kingdom.

*Primary Examiner*—G. O. Peters
*Attorney, Agent, or Firm*—James L. Wilson; Arthur G. Gilkes; William T. McClain

[57] ABSTRACT

The process comprises the step of passing the nitrogen oxides through a zone maintained at conditions at which said nitrogen oxides will be reduced, said zone including a substantially rigid catalytic member of a metal support or substrate plated with one or more members selected from the group consisting of copper, nickel, iron, and chromium and having, at least in part, an oxidized surface that catalytically promotes the reduction of the oxides of nitrogen as they pass through said zone.

35 Claims, 5 Drawing Figures

ACTIVITY FOR COPPER-PLATED STAINLESS STEEL
11.2 SCFM/LB.

FIG. 4

ACTIVATION OF COPPER-PLATED STAINLESS STEEL
AGED WITH 2% OXYGEN
11.2 SCFM/LB.
TEMP. = 840°F.

FIG. 5

EFFECT ON $NO_x$ LEVEL ON REDUCTION AT 840°F.

PROCESS FOR REDUCING OXIDES NITROGEN IN THE EXHAUST GAS FROM INTERNAL COMBUSTION ENGINES

CROSS-REFERENCES TO RELATED APPLICATIONS

This application is a continuation-in-part application of co-pending application U.S. Ser. No. 329,898, which was filed on Feb. 5, 1973. U.S. Ser. No. 329,898 is a continuation-in-part application of U.S. Ser. No. 104,214, which was filed on Jan. 6, 1971, and all now abandoned.

BACKGROUND OF THE INVENTION

Future United States government standards will probably require the reduction of nitrogen oxide gases present in the exhaust from an automobile to levels not exceeding about 100 p.p.m. Also, most carbon monoxide and hydrocarbons present in the exhaust will have to be eliminated. A contemplated system for treating these exhaust contaminants includes a two-stage catalytic converter. The first stage or reactor treats exhaust gases directly coming from the exhaust system under reducing conditions. In this first reactor, the nitrogen oxide gases in the exhaust react with hydrocarbons and carbon monoxide in the exhaust. Just prior to or in the second stage or reactor, oxygen is injected into the exhaust stream. Oxidation occurs in this second stage, where the hydrocarbons and carbon monoxide react with the oxygen. Such a two-stage catalytic converter is being designed, with each stage containing different types of catalyst. Such a converter requires that the internal combustion engine be operated at fuel-rich conditions, insuring the presence of sufficient carbon monoxide and hydrocarbons to react with the nitrogen oxide gases.

The catalyst in the first stage is called the $NO_x$ catalyst. It promotes the reduction of nitrogen oxides. Several different and sometimes competing reactions can and do occur as the exhaust flows over the $NO_x$ catalyst. The most important reactions are:

$$NO_x + CO \rightarrow N_2 + CO_2 \quad (1)$$

$$NO_x + H_2 \rightarrow NH_3 + N_2 + H_2O \quad (2)$$

$$2CO + O_2 \rightarrow 2CO_2 \quad (3)$$

$$2H_2 + O_2 \rightarrow 2H_2O \quad (4)$$

Reactions Nos. 1 and 2 are the reactions responsible for eliminating $NO_x$ as an exhaust pollutant. Advantageously, the $NO_x$ catalyst favors these reactions rather than Reactions Nos. 3 and 4. Preferably, the $NO_x$ catalyst favors Reaction No. 1 over a wide range of temperatures, for example, from 700° to 1,700° F. Reaction No. 2 is undesirable because ammonia formed in the first stage of the converter will be converted to nitrogen oxide in the second stage. This ammonia formation will defeat, at least in part, the purpose of the converter. Consequently, a desirable $NO_x$ catalyst will not promote Reaction No. 2 or will minimize formation of $NH_3$ in favor of $N_2$. Reduction to $NH_3$ occurs most frequently at low temperatures. Reactions Nos. 3 and 4 are undesirable because carbon monoxide and hydrogen are oxidized. The $NO_x$ catalyst requires that some carbon monoxide be present in the exhaust. However, there is also present in the exhaust some oxygen, which reacts with carbon monoxide, using the carbon monoxide least advantageously. The preferred $NO_x$ catalyst will selectively promote the reaction of carbon monoxide with $NO_x$ in the presence of small amounts of oxygen (up to about 1%). There has now been developed an improved $NO_x$ catalyst and a process employing that catalyst.

SUMMARY OF THE INVENTION

Broadly, according to the present invention, there is provided a process for reducing the oxides of nitrogen in the exhaust gases from an internal combustion engine, which process comprises the step of passing the nitrogen oxides through a zone maintained at conditions at which said nitrogen oxides will be reduced, said zone including a substantially rigid catalytic member of a metal support or substrate plated with one or more members selected from the group consisting of copper, nickel, iron, and chromium and having, at least in part, an oxidized surface that catalytically promotes the reduction of the oxides of nitrogen as they pass through said zone. The catalytic member has a reticulated structure and the metal support or substrate is a tough, strong metal or metal alloy having a melting point in excess of about 2,000° F.

The exhaust includes carbon monoxide that reacts with the oxides of nitrogen as the exhaust passes through the zone. Preferably, the exhaust includes at least about 1.0 volume percent carbon monoxide and the ratio of carbon monoxide to oxygen is at least 1:1.

Typical reducing conditions include temperatures in excess of about 700° F., preferably from about 850° to about 1,400° F., and the space velocity of the exhaust is no greater than about 30 standard cubic feet of exhaust per minute per pound of catalyst [s.c.ft./min./lb.], preferably about 10 to about 25 s.c.ft./min./lb.

Further details of our invention are set forth below in the description and accompanying drawings.

DESCRIPTION AND PREFERRED EMBODIMENTS

According to our invention, there is provided a catalyst for catalytically reducing the oxides of nitrogen in the exhaust gases from an internal combustion engine and a method for preparing this catalyst or catalytic member.

The catalyst or catalytic member is a rigid catalyst member composed of a metal support or substrate plated with one or more members selected from the group consisting of copper, nickel, iron, cobalt, vanadium, titanium, manganese, molybdenum, aluminum, tungsten, and chromium and having, at least in part, an oxidized surface that catalytically promotes the reduction of nitrogen oxides. It is employed conveniently in a process for reducing the oxides of nitrogen in the exhaust gases from an internal combustion engine and serves to promote NO$_x$ reduction when the engine is operated under fuel-rich conditions so the engine exhaust contains at least one volume percent carbon monoxide and the ratio of carbon monoxide to oxygen is at least 1:1. Such conditions insure the presence of enough carbon monoxide to react with the NO$_x$ gases. The exhaust is passed through the first stage of the converter at a temperature of about 1,000° F. to about 1,700° F. Under these conditions the reaction of nitrogen oxides with carbon monoxide is favored using our catalyst. External oxygen may initially be added at engine start-up in order to meet Federal Emission Standards in accordance with cold start-up test procedures.

This catalyst may be employed in a catalytic muffler device or a catalytic converter for removing the oxides of nitrogen from the exhaust of an internal combustion engine. Briefly, such a device includes a chamber having an inlet and an outlet permitting the oxides of nitrogen to flow therethrough and the substantially rigid catalytic member of our invention.

According to our invention, there is provided a catalyst for catalytically reducing the oxides of nitrogen in the exhaust gases from an internal combustion engine, which catalyst comprises a catalytic surface of one or more metallic oxides formed on a substantially rigid, reticulated support or substrate of a tough, strong metal or metal alloy having a melting point in excess of about 2,000° F., said oxides being those of one or more members selected from the group consisting of copper, nickel, iron, and chromium, and said catalyst being prepared by the method comprising the steps of: (a) plating the surface of said support or substrate with one or more layers of one or more of said members to form a plated support or substrate, (b) heating in an inert atmosphere said plated support or substrate so that the atoms on the surfaces of said members interdiffuse with themselves and with surface atoms of said support or substrate, and (c) exposing said plated support or substrate to oxidizing conditions to oxidize, at least in part, the atoms at or near the surface of said plated support or substrate to form thereat oxides of said members. In the heating of the plated support or substrate in an inert atmosphere, it is to be understood that, notwithstanding the number of different members or layers, atoms of the member in the layer next to the actual surface of the support or substrate will interdiffuse with atoms from each and every other plated layer and at least a portion of the atoms of the member in the layer next to the actual surface of the support will be found at the surface of the plated material after such treatment.

The catalyst may be a catalyst wherein the support or substrate is a stainless steel or Inconel, an alloy comprising nickel, iron, and chromium, and contains one or more members of the group consisting of copper, vanadium, titanium, manganese, molybdenum, aluminum, tungsten, and chromium.

In one embodiment of our catalyst, a support or substrate of an alloy comprising nickel, iron, and chromium has a surface of the oxides of copper, nickel, chromium, and iron. In a second embodiment, a support or substrate of a stainless steel has a surface of the same oxides produced thereon. In other embodiments of the catalyst, the oxides comprise the oxides of chromium and the oxides of one or more members selected from the group consisting of copper, nickel, and iron.

An embodiment of our catalyst may be employed in a catalytic muffler device.

Figure 1:
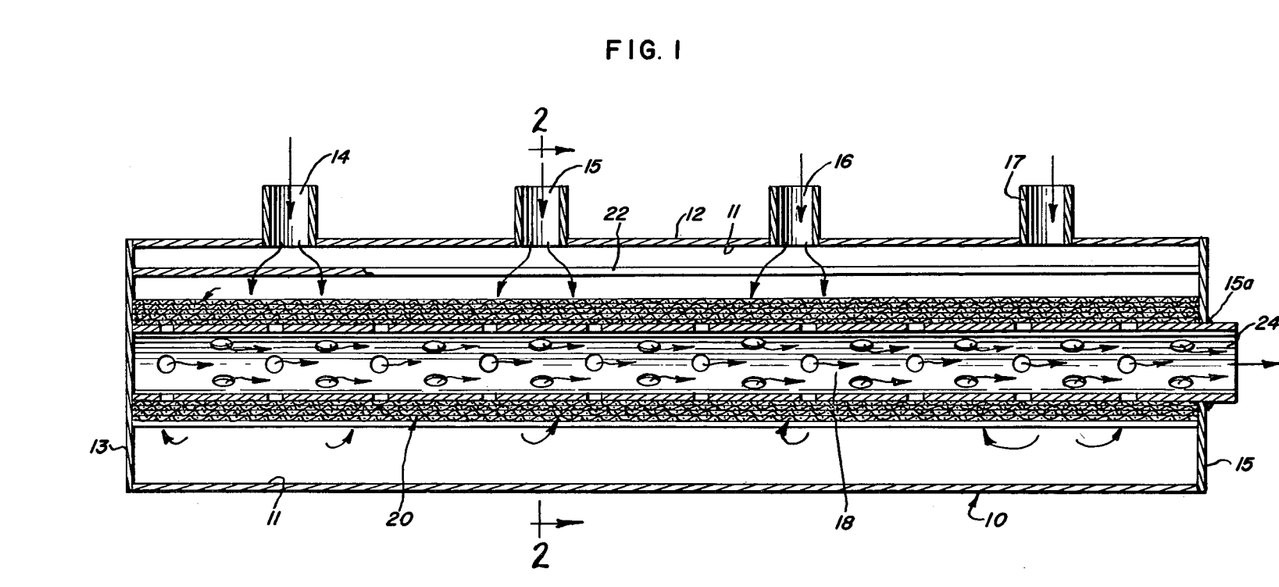
FIG. 1 is a sectional view of an example of a catalytic muffler device taken along the longitudinal axis of the device.
Figure 2:
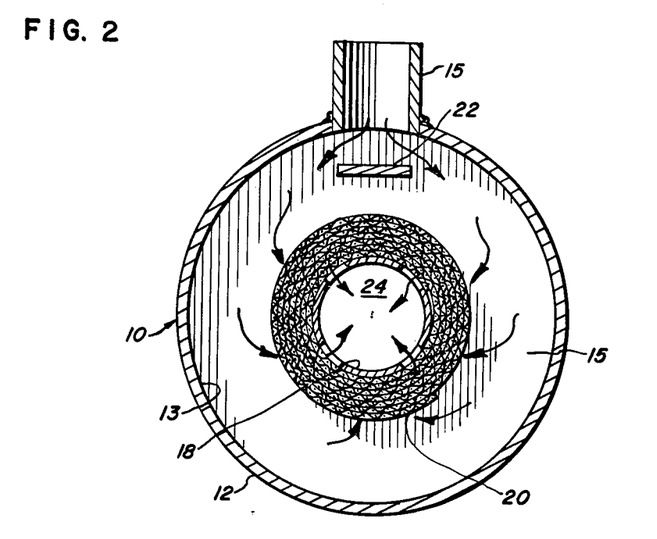
FIG. 2 is a cross-sectional view taken along line 2—2 of FIG. 1.

FIGS. 1 and 2 illustrate an example of a catalytic muffler device, designated 10. Muffler device 10 includes a cylindrical chamber 12 having sidewall 11, closed end plate 13 and open end plate 15. There are four spaced inlets 14–17 in sidewall 11, and these inlets are connected to the exhaust manifold of an internal combustion engine to permit the exhaust from the engine to flow into chamber 12. Perforated conduit 18, concentric with the longitudinal axis of chamber 12, extends from closed end plate 14 to and through opening 15a in end plate 15. Conduit 18 is welded in place, and coiled up around it is reticulated catalytic member 20. This reticulated member 20 is made of Catalyst No. 1 or Catalyst No. 2, which are described hereinafter, and has, at least in part, an oxidized surface. Between inlets 14–17 and reticulated member 20 is deflector 22. As exhaust flows into inlets 14–17, deflector 22 directs the stream of gases toward chamber sidewall 11, creating a turbulence within chamber 12. Gases then flow through reticulated member 20 into perforated conduit 18, along the inside of the conduit, and then out open conduit end 24, which serves as the outlet for chamber 12. Gases coming from the outlet have substantially lower nitrogen oxide levels than the exhaust flowing into chamber 12.

Exhaust gases from the internal combustion engine generally can be adjusted to include from about 1.0 to about 2.5 volume percent carbon monoxide and they also include other reducing agents such as hydrocarbons or hydrogen. When the temperature of the catalytic member in the reducing zone is in excess of about 700° F., preferably from about 850° to about 1,400° F., and the space velocity of the exhaust is no greater than about 30 standard cubic feet of gas per minute per pound of catalyst [s.c.ft./min./lb.], preferably from about 10 to about 25 s.c.ft./min./lb., reduction of the oxides of nitrogen rapidly occurs. There may be short-term excursions of the temperature to levels as high as 1,700° F., and the catalytic member is capable of withstanding such a temperature and performing adequately at such a temperature.

Our process for reducing nitrogen oxides in an exhaust gas obtained from the combustion of hydrocarbon materials is a process which comprises the step of passing said nitrogen oxides through a zone maintained at conditions at which said nitrogen oxides will be reduced, said zone including a substantially rigid catalytic member of a metal support or substrate plated with one or more members selected from the group consisting of copper, nickel, iron, and chromium and having, at least in part, an oxidized surface that catalytically promotes the reduction of said nitrogen oxides as they pass through said zone. This process may be employed to reduce the oxides of nitrogen in the exhaust of an internal combustion engine, said exhaust including carbon monoxide that reacts with the oxides of nitrogen as the exhaust passes through said zone. Preferably, the exhaust includes at least about 1.0 volume percent carbon monoxide and the ratio of carbon monoxide to oxygen is at least 1:1.

Typical reducing conditions employed in our process include temperatures of about 700° F. to about 1,700° F., preferably from about 850° F. to about 1,400° F., and the space velocity of the exhaust is no greater than about 30 s.c.ft./min./lb., preferably, about 10 to about 25 s.c.ft./min./lb.

Catalyst No. 1 and Catalyst No. 2 are examples of the catalyst of the present invention.

Catalyst No. 1

This catalyst comprises a rigid catalytic member composed chiefly of iron plated with copper and having, at least in part, an oxidized surface that catalytically promotes the reduction of the oxides of nitrogen as they pass through said zone. The metallic oxide is a mix of copper and iron oxides which are chemically bonded to the iron surface. This oxide surface comprises a thin layer, preferably from about 0.001 inch to about 0.008 inch thick. The member preferably has a reticulated structure, such as a screen, a network of interconnected tubular members, or an expanded metal structure. For screens, the oxides on the individual wires comprise about 50% of the wire and are at the surface thereof. The oxides of nitrogen pass through the reticulated structure and intimately contact the surface area of the catalytic member.

One preferred form of this catalytic member consists essentially of a copper-plated steel alloy. This preferred alloy is prepared by heating copper-plated steel in an inert atmosphere so that the copper and iron atoms interdiffuse on the surface of the metal. Next, this copper-plated surface of the steel is oxidized so that, at least in part, copper and iron atoms which are near the surface of the metal will be converted to the oxides of copper and iron. The heating step is preferably conducted at temperatures in excess of about 1,400° F. Suitable inert atmospheres are nitrogen, carbon dioxide, helium, or argon. Oxidation of the copper-plated steel is preferably conducted by exposing the metal to an oxygen-containing atmosphere, preferably from about 1,200° F. to about 1,600° F. Oxidation of the metal may also be accomplished by exposing the metal to an exhaust from an internal combustion engine operated under lean-fuel conditions and including at least about 1.5 volume percent oxygen. The amount of copper coating on the steel preferably is such that the ratio of iron to copper in the oxides formed at or near the surface is about 1:1.

We have found that copper-plated steel can be activated over a period of several days in the exhaust from an internal combustion engine. Copper-plated stainless steel (type 502) and copper-plated carbon steel were used to treat exhaust gases containing 2% carbon monoxide. This exhaust was at 1,000° F. and was passed over the catalyst at a space velocity of 21,000 hour$^{-1}$. Initial tests seemed to indicate that the thin surface layer of copper was lost. Nevertheless, there remained a highly active steel catalyst. Further studies using electron probe microanalysis have indicated that the copper is retained in the outer layer of the catalyst. This layer is about 0.0001 inch thick and contains from about 10 to about 25% copper, depending on the original concentration of copper plating. Analysis by X-ray diffraction indicated that, apparently, copper is chemically bound with iron and oxygen in the form of $FeO_2Cu$. Highly activated catalysts have been prepared where the ratio of iron to copper is about 1:1. For example, after 32 hours of tests, the type 502 steel was still 90% effective. In fact, these catalysts seemed to increase slightly in activity with use.

Figure 3:
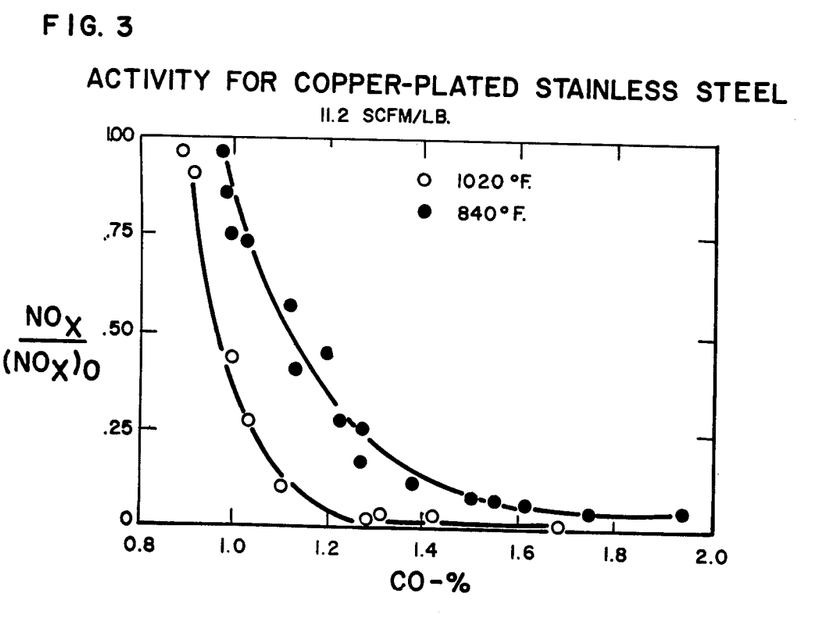
FIG. 3 is a graph showing the activity of copper-plated stainless steel at 840° F. and 1,020° F.

FIG. 3 shows the results obtained after several days use of our catalyst alternating between 840° F. and 1,020° F. This figure is a plot of the ratio of $NO_x$ gases in the effluent from a catalytic bed to $NO_x$ gases in the exhaust, $NO_x/(NO_x)_o$, versus the carbon monoxide concentration in the exhaust. As illustrated, even at the lower temperature, over 90% effectiveness was obtained with 1.5% carbon monoxide in the exhaust. At the higher temperature, higher efficiency is obtained even with much lower carbon monoxide concentration in the exhaust gases. The catalytic charge was equivalent to about 11.2 s.c.ft./min./lb.

Figure 4:
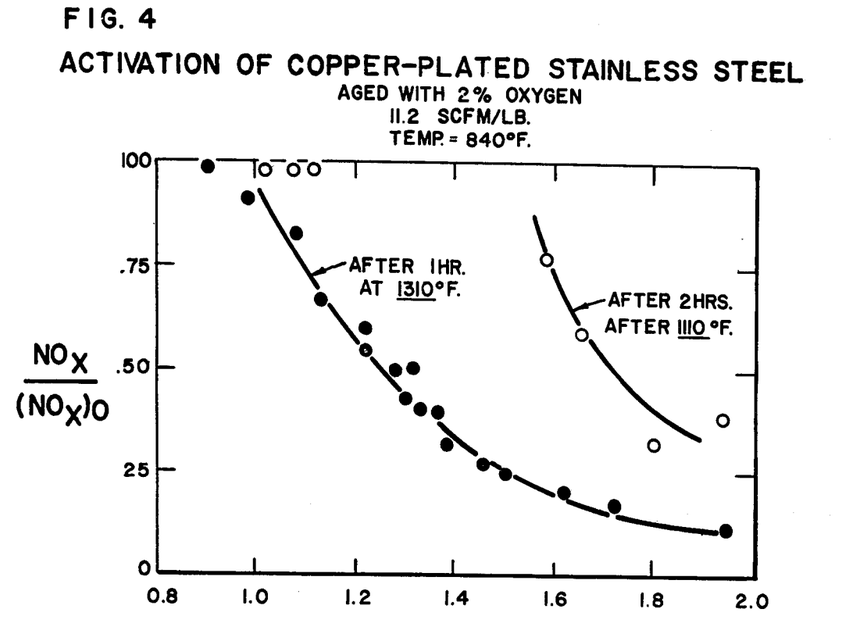
FIG. 4 is a graph showing activation of the copper-plated stainless steel under different conditions.

As previously mentioned, our catalyst does not require preactivation. However, it would be preferable to activate the catalyst before installation in an automobile. FIG. 4 illustrates results of a 1-hour pre-treatment of copper-plated type 304 stainless steel wire (24 mesh cloth) with exhaust gases containing 2% oxygen at 1,310° F. This figure is a plot of the ratio of $NO_x$ in the effluent of the catalytic bed to $NO_x$ in the exhaust, $NO_x/(NO_x)_o$, versus carbon monoxide concentration in the exhaust. As illustrated, a highly active catalyst is provided. Oxidation (2% oxygen) at 1,110° F. for 2 hours was also attempted as a preactivation procedure. As shown, lower temperature activation is not as effective as higher temperature activation.

We also tested copper-plated type 304 stainless steel additionally plated with nickel, manganese, cobalt, or chromium to determine whether stainless steel could be activated for lower temperature effectiveness. Table I presents the results for various temperatures obtained at 21,000 hour$^{-1}$ space velocity and 2.0% carbon monoxide. Over a temperature range from 750° to 1,150°., none of these replated materials was more effective than copper-plated stainless steel.

Table I

| ACTIVITY OF PLATED TYPE 304 STAINLESS STEEL | | | | | |
|---|---|---|---|---|---|
| (SV = 21,000 hour$^{-1}$; Carbon Monoxide = 2.0%) | | | | | |
| | % $NO_x$ Reduction | | | | |
| Temp., ° F. | Cu | Ni/Cu | Mn/Cu | Co/Cu | Cr/Cu |
| 750 | 8 | — | — | — | — |
| 840 | 56 | — | — | — | 36 |
| 890 | 85 | — | — | 33 | — |
| 930 | 83 | 25 | — | 92 | 61 |
| 975 | 89 | 56 | — | 86 | — |
| 1020 | 89 | 92 | — | — | 63 |
| 1065 | — | — | — | 87 | 85 |
| 1110 | 90 | 95 | 65 | — | 92 |
| 1155 | — | — | — | 92 | — |

Figure 5:
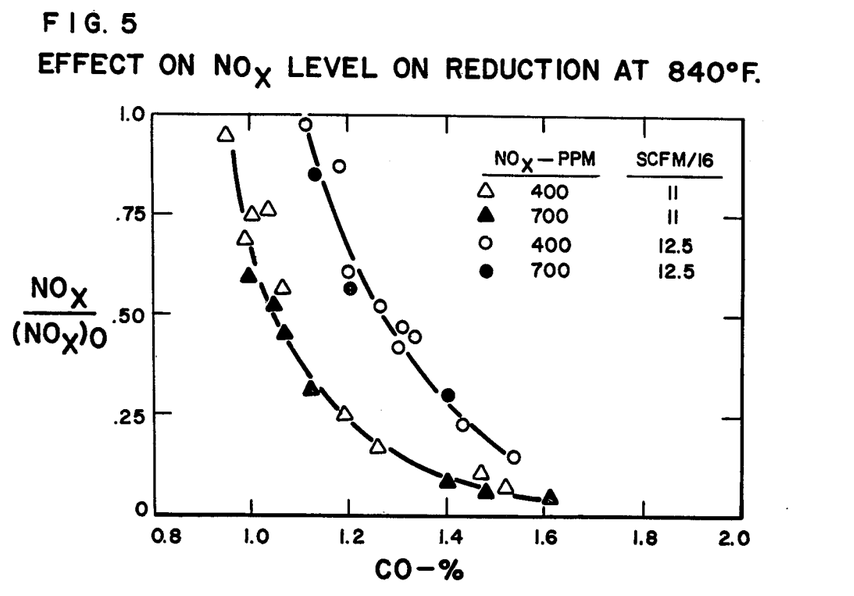
FIG. 5 is a graph showing the effect of $NO_x$ level on reduction.

We have also found that lowering the $NO_x$ level in exhaust gases from about 700 to about 400 ppm does not adversely affect the conversion efficiency of the copper-plated stainless steel catalyst. FIG. 5 shows results at 840° F. for two different space velocities, 11 and 12.5 s.c.ft./min./lb. This figure is a plot of the $NO_x$ gases in the effluent from the catalyst bed to $NO_x$ gases in the exhaust, $NO_x/(NO_x)_o$, versus the carbon monoxide concentration in the exhaust. Data points for both levels of $NO_x$ fall in the same curves relating to $NO_x$ reduction with carbon monoxide concentration. Thus, $NO_x$ concentration in the exhaust does not bear significantly on performance of our catalyst.

Catalyst No. 2

This catalyst comprises a substantially rigid, reticulated catalytic member made of metal and having a copper-nickel surface. This member is rigid, reticulated and is made of a tough, strong metal or metal alloy having a melting point which exceeds about 2,000° F. In accordance with our invention, the surface of said metal has thereon the oxides of nickel and copper. Most preferably the surface also includes oxides of iron and chromium. These oxides are produced by a special technique wherein the surface of the metal or metal alloy is first successively plated with layers of the metal or metals. Then the layers are heated in an inert atmosphere to permit the atoms of the layers to interdiffuse with themselves and with the atoms of the surface. Finally, the plated surface is calcined to form the oxides. Preferably, calcination is conducted in moist air at a temperature ranging from about 1,400° F. to about 1,600° F. for about 4 hours. This is not critical so long as the surface of the catalytic member is oxidized. The metal support may be any tough, strong metal, for example, iron, nickel, or cobalt. Alloys of these metals can be used containing copper, vanadium, titanium, manganese, molybdenum, aluminum, tungsten, or chromium. The metal support is plated with the metals and then heated in an inert atmosphere, such as nitrogen, helium, argon, or a vacuum. The amounts of metal oxides are expressed as ratios relative to the nickel. Therefore, with nickel as 1, the ratio of copper to nickel is from about 0.25 to about 0.4, the ratio of iron to nickel is from about 0.05 to about 0.1 and the ratio of chromium to nickel is from about 0.2 to about 0.4.

The copper is preferably plated before the others. The thickness of the copper layer ranges from about 0.03 to 0.40 mil; the thickness of the nickel layer, next to be plated, ranges from about 0.125 to about 1.0 mil; the thickness of the chromium layer, next to be plated, ranges from about 0.03 to about 0.4 mil; and the thickness of the iron layer, the last to be plated, ranges between about 0.006 and about 0.10 mil. After plating by means of conventional techniques, the layers are heated at temperatures over 1,200° F. for a time sufficient to permit the layers to interdiffuse. For example, at 2,000° F., the layers need to be heated for only a short time, about 15 minutes. At 1,400° F., they are heated for about 4 hours. Any inert atmosphere is suitable. After heating, the surfaces are then exposed to moist air for about 4 hours at temperatures between about 1,400° and 1,600° F. Although not critical, this does provide a substantially oxidized surface including the oxides of nickel, copper, iron, and chromium. Preferably, the ratio of nickel to copper is about 4:1. Nickel serves to suppress ammonium formation and the copper serves as a promoter for the low-temperature reduction of the nitrogen oxides in the exhaust. Chromium is also a good reduction reaction promoter, but is expensive and the amount to be used is minimal. Iron is also good, but it tends to form at low temperatures ammonia and, therefore, only a small amount is employed.

Other embodiments of the catalyst of this invention are presented in the following examples.

EXAMPLE I

Inconel expanded mesh specimens were cleaned by alternate immersions in concentrated nitric acid and water. After cleaning, copper was electroplated onto the inconel in a copper cyanide plating bath at room temperature using a plating current and voltage of 45 ma. and 2.0 v., respectively. Following the copper electroplating, the specimens were rinsed in distilled water, placed in a nickel sulfate plating bath, and nickel was electroplated using the same voltage and current as for copper. This catalyst is identified hereinafter as Catalyst No. 3. After washing and drying, a portion of the specimens was treated at 2,000° F. in helium for 15 minutes.

EXAMPLE II

Inconel expanded mesh specimens were plated with copper as described in Example I. After copper electroplating, the specimens were rinsed in distilled water and placed in a chromic acid bath. Chromium was electroplated at approximately 500 ma. and 2.5 v. after rinsing the specimens, and nickel was electroplated in the same manner as described in Example I. Following the nickel, iron was electroplated from a ferrous sulfate solution. This catalyst is identified hereinafter as Catalyst No. 4. After rinsing and drying, a portion of the specimens was treated at 2,000° F. in helium for 15 minutes.

The following table, Table II, illustrates the different activities of Catalyst No. 3, a copper-nickel-plated catalyst, where it has been first preheated in inert atmosphere to permit interdiffusion of the layers and where it has not been so preheated, but simply oxidized. Preheating in an inert atmosphere prior to oxidation of the surface provides a catalyst which has a substantially improved activity at low carbon monoxide concentrations permitting maximum economies in fuel usage. The table also presents the activities obtained with Catalyst No. 4, where it has been preheated in an inert atmosphere prior to being oxidized.

TABLE II

| ACTIVITIES OF PLATED INCONEL METAL | | | |
|---|---|---|---|
| (SV = 25 s.c.f./min./lb.; Temp. = 1,020° F.) | | | |
| | | % NO$_x$ Reduction at % Co | | |
| Catalyst No. | Treated | 1.2 | 1.5 | 2.0 |
| 3 | NO | 0 | 10 | 75 |
| 3 | YES | 35 | 85 | 95 |
| 4 | YES | 15 | 92 | 95 |

According to the present invention, there is provided a process for making a catalyst for reducing oxides of nitrogen, which process comprises the steps of: (a) heating in an inert atmosphere a support or substrate plated with one or more thin layers of one or more members selected from the group consisting of copper, nickel, iron, and chromium so that the atoms on the surfaces of said members interdiffuse with themselves and with surface atoms of said support or substrate, and (b) exposing said support or substrate plated with said layers of said members to oxidizing conditions to oxidize, at least in part, the atoms at or near the surface of said plated support or substrate to form thereat oxides of said members. In one embodiment, the process comprises the steps of: (a) heating in an inert atmosphere a metal substrate plated with a thin layer of copper or thin layers of copper and nickel so that the atoms in the layer or layers interdiffuse with themselves and with the atoms of the substrate to form a surface of mixed metals, and (b) exposing said surface of mixed metals to oxidizing conditions to oxidize, at least in part, the atoms at or near said surface of mixed metals to form thereat oxides of said mixed metals. The heating step is conducted at temperatures in excess of about 1,400° F. and the inert atmosphere is nitrogen, carbon dioxide, helium, or argon. The oxidation of the surface of mixed metals is conducted in an oxygen-containing atmosphere, which may include moisture. The oxidation of the surface of mixed metals may be accomplished also by exposing it to an exhaust from an internal combustion engine operated under lean-fuel conditions and including at least about 1.5 volume percent oxygen. The substrate comprises iron, and sufficient copper is present on the surface of the substrate so that the ratio of iron to copper in the oxides formed at or near the surface is about 1:1.

What we claim is:

1. A process for reducing nitrogen oxides in an exhaust gas obtained from the combustion of hydrocarbon materials, which process comprises the step of passing said nitrogen oxides through a zone maintained at conditions at which said nitrogen oxides will be reduced, said zone including a substantially rigid catalytic member of a metal support or substrate plated with one or more members selected from the group consisting of copper, nickel, iron, and chromium and having, at least in part, an oxidized surface that catalytically promotes the reduction of said nitrogen oxides as they pass through said zone, said catalytic member having a reticulated structure and said metal support or substrate being a tough, strong metal or metal alloy having a melting point in excess of about 2,000° F., and said catalyst being prepared by the method comprising the steps of: (a) plating the surface of said support or substrate with one or more layers of one or more of said members to form a plated support or substrate, (b) heating in an inert atmosphere said plated support or substrate so that the atoms on the surfaces of said members interdiffuse with themselves and with surface atoms of said support or substrate, and (c) exposing said plated support or substrate to an oxygen-containing atmosphere in the presence or absence of moisture and at a temperature of about 1,200° F. to about 1,600° F. to oxidize, at least in part, the atoms at or near the surface of said plated support or substrate to form thereat oxides of said members.

2. The process of claim 1 wherein said support or substrate is plated with copper or with copper and nickel.

3. The process of claim 1 wherein said catalytic member is made of copper-plated steel.

4. The process of claim 1 wherein said nitrogen oxides are from the exhaust of an internal combustion engine, said exhaust including carbon monoxide that reacts with the nitrogen oxides as the exhaust passes through said zone.

5. The process of claim 2 wherein said catalytic member is made of copper-plated steel.

6. The process of claim 2 wherein said nitrogen oxides are from the exhaust of an internal combustion engine, said exhaust including carbon monoxide that reacts with the nitrogen oxides as the exhaust passes through said zone.

7. The process of claim 4 wherein the exhaust includes at least about 1.0 volume percent carbon monoxide and the ratio of carbon monoxide to oxygen is at least 1:1.

8. The process of claim 6 wherein the exhaust includes at least about 1.0 volume percent carbon monoxide and the ratio of carbon monoxide to oxygen is at least 1:1.

9. The process of claim 7 wherein said conditions at which nitrogen oxides will be reduced include temperatures of about 700° F. to about 1,700° F. and the space velocity of the exhaust is no greater than about 30 s.c.ft./min./lb.

10. The process of claim 8 wherein said conditions at which nitrogen oxides will be reduced include temperatures of about 700° F. to about 1,700° F. and the space velocity of the exhaust is no greater than about 30 s.c.ft./min./lb.

11. The process of claim 10 wherein said support or substrate of said catalytic member is a stainless steel or an alloy comprising nickel, iron, and chromium.

12. A process for reducing nitrogen oxides in an exhaust gas obtained from the combustion of hydrocarbon materials, which process comprises the step of passing said exhaust gas through a zone maintained at conditions for reducing said nitrogen oxides and including a catalyst prepared by the method comprising the steps of: (a) heating in an inert atmosphere a support or substrate plated with one or more thin layers of one or more members selected from the group consisting of copper, nickel, iron, and chromium so that the atoms on the surfaces of said members interdiffuse with themselves and with surface atoms of said support or substrate, and (b) exposing said support or substrate plated with said layers of said members to an oxygen-containing atmosphere in the presence or absence of moisture and at a temperature of about 1,200° F. to about 1,600° F. to oxidize, at least in part, the atoms at or near the surface of said plated support or substrate to form thereat oxides of said members, said catalyst having a reticulated structure and said support or substrate being a tough, strong metal or metal alloy having a melting point in excess of about 2,000° F.

13. The process of claim 12 wherein said support or substrate is plated with a layer of copper or layers of copper and nickel.

14. The process of claim 12 wherein the heating step is conducted at temperatures in excess of about 1,400° F.

15. The process of claim 12 wherein the inert atmosphere is nitrogen, carbon dioxide, helium, or argon.

16. The process of claim 12 wherein the oxidation of the atoms at or near the surface of said plated support or substrate is conducted in an oxygen-containing atmosphere.

17. The process of claim 12 wherein the oxidation of the atoms at or near the surface of said plated support or substrate is accomplished by exposing said plated support or substrate to an exhaust from an internal combustion engine operated under lean-fuel conditions and including at least about 1.5 volume percent oxygen.

18. The process of claim 12 wherein the support or substrate comprises iron and sufficient copper is present on the surface of said support or substrate so that the ratio of iron to copper in the oxides formed at or near the surface is about 1:1.

19. The process of claim 13 wherein the heating step is conducted at temperatures in excess of about 1,400° F.

20. The process of claim 13 wherein the inert atmosphere is nitrogen, carbon dioxide, helium, or argon.

21. The process of claim 13 wherein the oxidation of the atoms at or near the surface of said plated support or substrate is conducted in an oxygen-containing atmosphere.

22. The process of claim 13 wherein the oxidation of the atoms at or near the surface of said plated support or substrate is accomplished by exposing said plated support or substrate to an exhaust from an internal combustion engine operated under lean-fuel conditions and including at least about 1.5 volume percent oxygen.

23. The process of claim 13 wherein said support or substrate comprises iron and wherein sufficient copper is present on the surface of said support or substrate so that the ratio of iron to copper in the oxides formed at or near the surface is about 1:1.

24. The process of claim 16 wherein the oxygen-containing atmosphere contains moisture.

25. The process of claim 16 wherein said conditions at which nitrogen oxides will be reduced include temperatures of about 700° F. to about 1,700° F. and the space velocity of the exhaust gas is no greater than about 30 s.c.ft./min./lb.

26. The process of claim 21 wherein said conditions at which nitrogen oxides will be reduced include temperatures of about 700° F. to about 1,700° F. and the space velocity of the exhaust gas is no greater than about 30 s.c.ft./min./lb.

27. The process of claim 21 wherein the oxygen-containing atmosphere contains moisture.

28. The process of claim 1 wherein said catalytic member comprises the oxides of copper, nickel, chromium, and iron deposited on a support or substrate of an alloy comprising nickel, iron, and chromium.

29. The process of claim 1 wherein said oxides comprise the oxides of chromium and the oxides of one or more members selected from the group consisting of copper, nickel, and iron.

30. The process of claim 1 wherein said catalytic member comprises the oxides of copper, nickel, chromium, and iron deposited on a support or substrate of a stainless steel or an alloy comprising nickel, iron, and chromium.

31. The process of claim 9 wherein said catalytic member comprises the oxides of copper, nickel, chromium, and iron deposited on a support or substrate of a stainless steel or an alloy comprising nickel, iron, and chromium.

32. The process of claim 9 wherein said temperatures are about 850° F. to about 1,400° F. and said space velocity is about 10 to about 25 s.c.ft./min./lb.

33. The process of claim 10 wherein said temperatures are about 850° F. to about 1,400° F. and said space velocity is about 10 to about 25 s.c.ft./min./lb.

34. The process of claim 25 wherein said temperatures are about 850° F. to about 1,400° F. and said space velocity is about 10 to about 25 s.c.ft./min./lb.

35. The process of claim 26 wherein said temperatures are about 850° F. to about 1,400° F. and said space velocity is about 10 to about 25 s.c.ft./min./lb.

* * * * *

UNITED STATES PATENT OFFICE
CERTIFICATE OF CORRECTION

Patent No. 4,104,360　　　　　　　　　Dated August 1, 1978

Inventor(s) GARBIS H. MEGUERIAN and FREDERICK W. RAKOWSKY

It is certified that error appears in the above-identified patent and that said Letters Patent are hereby corrected as shown below:

Figure 4, ordinate　　　"100" should be -- 1.0 --.

Figure 4, ordinate　　　"25" should be -- .25 --.

Signed and Sealed this

First Day of April 1980

[SEAL]

Attest:

SIDNEY A. DIAMOND

Attesting Officer　　　Commissioner of Patents and Trademarks